(12) United States Patent
Van Druff et al.

(10) Patent No.: US 6,930,611 B1
(45) Date of Patent: Aug. 16, 2005

(54) WATER ACTIVATED RELEASE TRIGGERING MECHANISM

(75) Inventors: Charles E. Van Druff, Laguna Hills, CA (US); Douglas G. Scheid, Orange, CA (US)

(73) Assignee: H. Koch & Sons Co., Inc., Anaheim, CA (US)

( * ) Notice: Subject to any disclaimer, the term of this patent is extended or adjusted under 35 U.S.C. 154(b) by 117 days.

(21) Appl. No.: 10/665,922

(22) Filed: Sep. 19, 2003

(51) Int. Cl.[7] .................................................. G08B 17/00
(52) U.S. Cl. ................... 340/644; 340/618; 340/620; 244/151 B; 73/290 R
(58) Field of Search ................... 340/644, 604, 340/618, 620; 73/290 R; 244/151 B

(56) References Cited

U.S. PATENT DOCUMENTS 3,567,158 A * 3/1971 Coyle .................... 244/122 B
3,614,542 A * 10/1971 Coyle ........................ 361/155
4,253,628 A * 3/1981 Marek .................... 244/151 A
5,398,214 A * 3/1995 Dale ............................. 367/4
5,857,247 A   1/1999 Warrick et al.

* cited by examiner

Primary Examiner—Julie Bichngoc Lieu
(74) Attorney, Agent, or Firm—Edgar W. Averill, Jr.

(57) ABSTRACT

A water activated release triggering mechanism is removably held to an exterior surface of a buckle housing and includes at least two probes and at least two batteries distributed between independent paths, for firing a squib. The distribution of batteries between independent paths precludes false firing from a single short with the body of the housing. The triggering mechanism is designed to be impervious to Electro Magnetic Interference (EMI) and to preclude false release in the presence of 20,000 volts of Electro Static Discharge (ESD). The triggering mechanism may be easily removed for servicing, replacement, or for upgrading. In one embodiment, the triggering mechanism causes the buckle to release in the same manner as during manual release.

19 Claims, 5 Drawing Sheets

WATER ACTIVATED RELEASE TRIGGERING MECHANISM

BACKGROUND OF THE INVENTION

The field of the invention is an automatic release mechanism, and the invention relates more particularly to a water activated automatic release mechanism for a parachute harness.

U.S. Pat. No. 5,857,247 issued Jan. 12, 1999, for "Buckle System for Manual or Automatic Release of Crew Member Harness from Parachute" and assigned to the assignee of the present application, discloses a buckle system having many of the features of the present invention. The '247 patent is incorporated herein by reference for background purposes.

Combat aircraft often operate over water, and due to the role of such aircraft, crew members may experience a need to parachute from the aircraft. Such need may result from hostile fire in combat, from an accident, or due to equipment failure. The crew members may further experience injury prior to exiting the aircraft, during the exiting, or after the exiting. In some cases, a crew member may land in water in an unconscious or disabled condition. If the crew member should land in water, and is unable to release their parachute, the added weight and/or drag may pull the crew member below the water surface, and may result in further injury or drowning.

To prevent such further injury or drowning, known parachute harnesses include an automatic release mechanism. Such release mechanism includes at least two critical requirements. First, that the mechanism has a high probability of correctly releasing the parachute if the crew member becomes immersed in water. Second, a near zero probability of false release. Generally, the crew member will be able to release the parachute, and therefore a failure of the automatic release mechanism to perform a correct release is generally not a critical event. Alternatively, a false release may be a fatal event.

The '247 patent teaches such release mechanism integrated internally into a buckle of the parachute harness. Although the release mechanism of the '247 patent provides the needed automatic release functionality, the release mechanism is not easily removed from the buckle for service, battery replacement, or to upgrade to a new release mechanism. Further, a new buckle system has been developed which requires a new automatic release mechanism. What is needed is an automatic release mechanism for the new buckle, which new automatic release mechanism may easily be removed for service, battery replacement, or to upgrade with a new release mechanism. Due to the extreme cost of a false release, there is also a need for false release events to have the lowest possible probability, while maintaining a reasonable probability of correct release.

BRIEF SUMMARY OF THE INVENTION

The present invention addresses the above and other needs by providing a water activated release triggering mechanism which is removably held to an exterior surface of a buckle housing and includes at least two probes, and at least two batteries distributed between independent paths, for firing a squib. The batteries are selected such that a single battery can not cause the squib to fire. Thus, the distribution of batteries between independent paths, combined with the power level of each battery, precludes false firing from a single short with the housing of the release mechanism. The batteries may be soldered into the associated circuit, and may be easily tested through the probes. The triggering mechanism is designed to be impervious to Electro Magnetic Interference (EMI) and to preclude false fire in the presence of 20,000 volts of Electro Static Discharge (ESD). The release mechanism may further be designed so that immersion in fresh water, as in the case of exposure to rain, will not cause the squib to fire. The triggering mechanism may be easily removed for servicing, replacement, or for upgrading, and may be designed to allow the batteries to be easily replaced at a depot, or by return to the manufacturer.

In accordance with one aspect of the invention, there is provided a water activated release mechanism comprising a first probe exposed to the environment, a second probe exposed to the environment, at least one first battery having a first positive terminal and a first negative terminal, the first positive terminal electronically connected to a first node and the first negative terminal electrically connected to the first probe, at least one second battery having a second positive terminal and a second negative terminal, the second positive terminal electronically connected to the second probe and the second negative terminal electrically connected to the second node, and a squib electrically connected between the first node and the second node. The at least one first battery preferably comprises two three-volt batteries and the at least one second battery preferably comprises two three-volt batteries. The batteries are selected so that the combined output of all of the batteries is required to fire the squib. The batteries are preferably long life batteries, preferable small size, and preferably tolerant to low temperatures, and more preferably lithium batteries and most preferably part number CR1616. The at least one first battery and the at least one second battery may be electrically connected through the first probe and the second probe (i.e., by joint immersion of the first probe and the second probe in salt water) to produce a positive voltage at the first node. The squib is preferably a one amp one watt squib and preferably provides a minimum force of approximately 100 lbs and a stroke of approximately 0.25 inches, and more preferably a part number P1590N actuator manufactured by Eagle Picher in Phoenix, Ariz. The squib may be embedded in a heat sink to inhibit false fire due to low power long term magnetically induced currents, and preferably the squib is electrically connected with a switch, the squib and switch being serially electrically connected between the first node and the second node. The probes may be any conductive material and preferably comprise gold cups. The probes are preferably located on opposite sides of the device housing and preferably approximately two to four inches apart. Alternatively, a single probe may electrically cooperate with the mechanism housing, buckle housing, or other suitable conductor.

The mechanism may further include a diode electrically connected between the first node and the second node, a cathode terminal of the diode electrically connected to the first node, an anode terminal of the diode electrically connected to the second node, a third node electrically connected between the anode terminal and the second node, a second resister electrically connected between the third node and the second node, and a lead electrically connecting the third node to a control gate of the switch. The switch is preferably adapted to remain open until the voltage on the first node is at least the breakdown voltage of the diode, at which event current flows through the diode to the third node and through the lead to close the switch. The diode is preferably a zener diode and more preferably a part number MA8091-H manufactured by Motorola. The second resister is preferably selected based on the SCR gate current, and more preferably at least approximately a 10,000 ohm resister. The switch is preferably a Silicon Controlled Rectifier (SCR), and more preferably a part number MCR8DSM manufactured by Motorola.

The mechanism may further include a capacitance C electrically connected between the first node and the second node and a resistance R1 electrically connected between the first node and the second node. The capacitance C preferable comprised at least approximately 2.7 m Farad capacitance, and more preferably six approximately 0.45 m Farad capacitors, wherein the capacitance may be selected to deliver between 550,000 and 5,000,000 ergs of energy, and preferably, the capacitance C is selected to match the requirements of the squib. The resistance R1 is preferably comprises a 150-ohm thermistor having a negative temperature coefficient, in series with a fixed 350 resister. The resistance R1 may be selected to cooperate with the required conductivity across the water probes to establish a maximum charging voltage across the capacitance C.

It is a further feature of the present invention to provide a water activated release mechanism comprising a first probe exposed to the environment, a second probe exposed to the environment, at least one battery electronically connected between the first probe and a first node, or the second probe and a second node, wherein the at least one battery is electrically connected to produce a positive voltage at the first node, a first resister electrically connected between the first and the second node, a capacitance electrically connected between the first node and the second node, a squib and a switch serially electrically connected between the first node and the second node, a diode having an anode terminal and a cathode terminal, the cathode terminal electrically connected to the first node, a third node electrically connected between the anode terminal and the second node, a second resister electrically connected between the third node and the second node, and a lead electrically connected between the third node and a control gate of the switch.

It is an additional feature of the invention to provide a method for activating a release mechanism, the method comprising steps of closing a circuit between a first probe and a second probe, creating a positive voltage at a first node from a first battery electrically connected between the first probe and the first node, and from a second battery electrically connected between a second node and the second probe, charging a capacitor electrically connected between the first node and the second node, exceeding a breakdown voltage of a diode having a cathode terminal electrically connected to the first node, and an anode terminal electrically connected to a control gate of a normally open switch, wherein the switch and a squib are serially electrically connected between the first node and the second node, closing the switch, and firing the squib.

BRIEF DESCRIPTION OF SEVERAL VIEWS OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
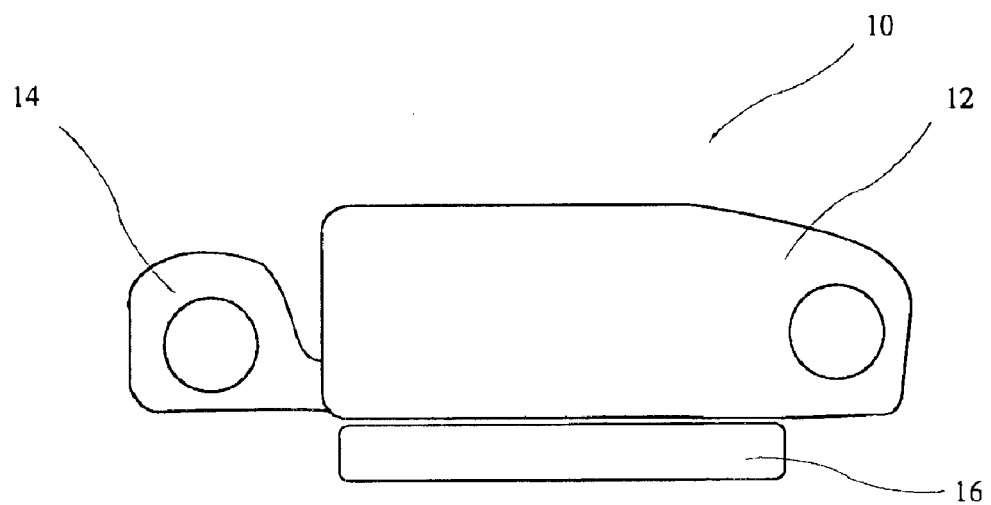
FIG. 1 is a buckle with a release triggering mechanism attached.

A harness buckle mechanism 10 including a buckle housing 12, a strap holder 14, and a water activated release triggering mechanism 16 is shown in FIG. 1. The triggering mechanism 16 is removably held to an exterior surface of a buckle housing, and preferably held to the surface which rests against a human body when the harness is in use, thus cushioning the triggering mechanism 16 against impacts. The triggering mechanism 16 is attached to the buckle housing 12 so as not to affect the load path of the parachute harness. The triggering mechanism 16 includes a housing which is preferably solid and preferably made from aluminum. The triggering mechanism 16 may be sealed to protect the elements with the triggering mechanism 16 from the environment.

Figure 2:
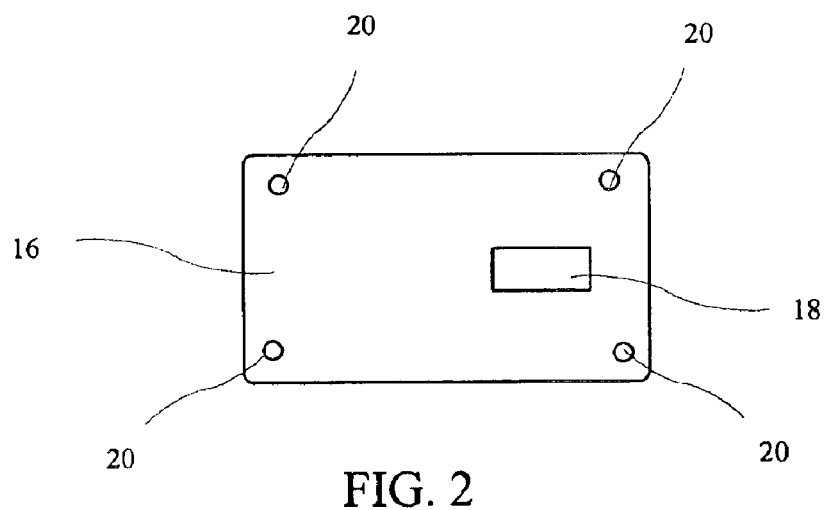
FIG. 2 is a top view of the release triggering mechanism.

A top view of the triggering mechanism 16 is shown in FIG. 2. A mechanism window 18 allows an arm, level, or other mechanical member of a buckle mechanism 10 to extend into the triggering mechanism 16 to mechanically cooperate with the triggering mechanism 16. In other embodiments, an arm or other mechanical element may protrude from the triggering mechanism 16 to provide cooperation with a buckle mechanism, or the triggering mechanism may be integrated into a buckle mechanism, and these other embodiments are intended to come within the scope of the present invention. The triggering mechanism 16 further includes four screw passages 20 to facilitate removal and replacement of the triggering mechanism 16. The triggering mechanism 16 may be attached to the buckle housing 12 by various other attachment methods, for example more or less than four screws, cooperation of features of the triggering mechanism 16 and features of the buckle housing 12, pop rivets, or the like, and a triggering mechanism 16 attached by any other method is intended to come within the scope of the present invention.

Figure 3:
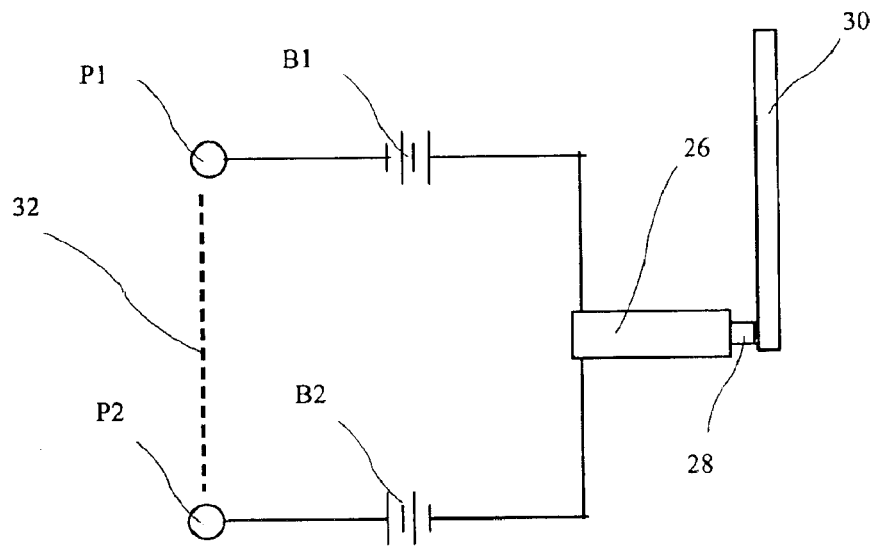
FIG. 3 is one embodiment of a circuit included in a release triggering mechanism.

The triggering mechanism 16 is an electromechanical device which includes a circuit for detecting the immersion of the device in water, and preferably immersion of the device in sea water. A first example of a circuit for use in the triggering mechanism 16 is shown in FIG. 3. The circuit includes a first probe P1, and a second probe P2, with water conductivity path 32 between the probes P1 and P2. The probes are preferably gold cups, and are preferably on the exterior of the triggering mechanism 16 approximately two to four inches apart and on opposite sides of the trigger mechanism 16. In other embodiments, the probes may be in recessed in the triggering mechanism, or the probes may be distally located from the triggering mechanism 16 and electrically connected to the triggering mechanism by probe leads, and such embodiments are intended to come within the scope of the present invention. A first battery B1 is electrically connected between the probe P1 and a squib 26, and a second battery B2 is independently electrically connected between the probe P2 and the squib 26. A piston or actuator 28 resides in the squib 26, and when the squib 26 fires, the piston 28 is pushed against a member 30 which initiates the release of the buckle. By placing the batteries in independent paths, a single short between a path or a probe and the triggering mechanism 16 housing can only provide half the required energy to the squib 26, thus preventing a false fire.

Figure 4:
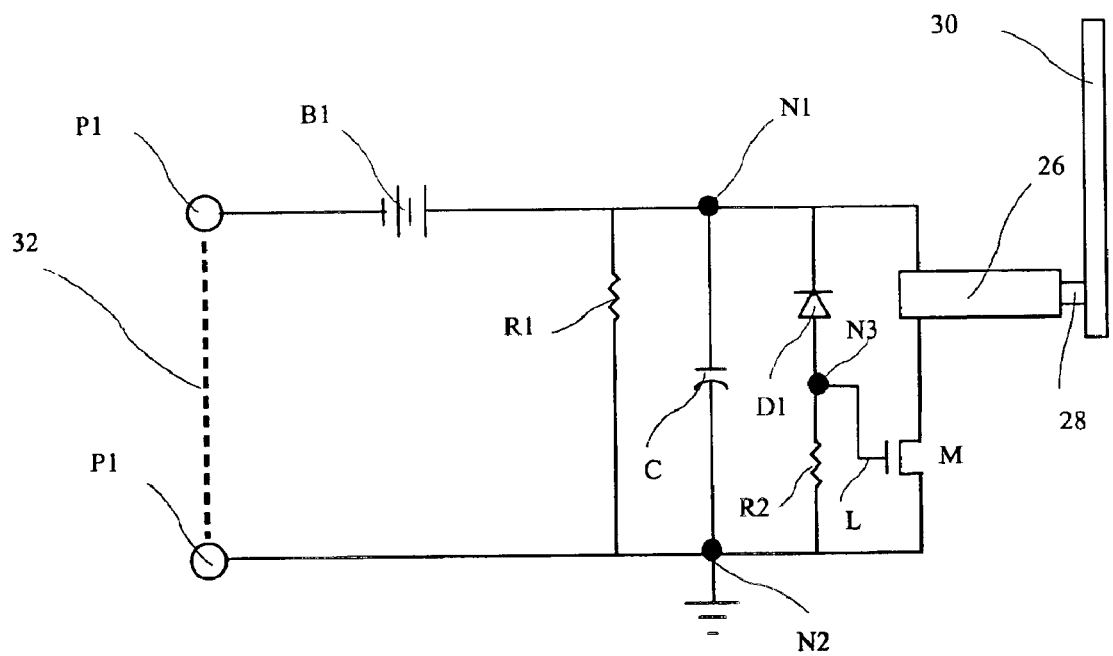
FIG. 4 is another embodiment of a circuit included in a release triggering mechanism.

A second example of a circuit for use in the triggering mechanism 16 is shown in FIG. 4. In many cases, the triggering mechanism 16 must operate in a highly electromagnetically active environment without false firing. Is such environment, even a short wire may act as an antenna and produce current flow within a circuit. In order to preclude false fires in such environments, a one watt one amp squib is preferably used. Additionally, the circuit may be designed to be impervious to Electro Magnetic Interference (EMI) and to preclude false fire in the presence of 20,000 volts of Electro Static Discharge (ESD).

The second circuit includes at least one battery B1 to create a positive voltage at a first node N1. The battery B1 is preferable electrically connected between the first probe P1 and the node N1, and may alternatively be electrically connected between a second node N2 and the second probe P2. Preferably, the battery comprises two independent batteries, with a first battery electrically connected between the probe P1 and the node N1, and a second battery electrically connected between the probe P2 and the node N2, and more preferably two independent batteries serially electrically connected between the probe P1 and the node N1, and two independent batteries serially electrically connected between the probe P2 and the node N2, which batteries are connected to contribute to a positive voltage at the node N1. A capacitor C is electrically connected between the node N1 and node N2.

A first resister R1 is connected between the nodes N1 and N2 in parallel with the capacitor C, to calibrate the conductivity. The squib 26 and a switch M are serially electrically connected between the nodes N1 and N2, and a first diode D1, a third node N3, and a second resister R2 are serially electrically connected between the nodes N1 and N2, wherein the node N3 is electrically connected between the diode D1 and node N2, and the resister R2 is connected between the node N3 and the node N2. The cathode terminal of the diode D1 is electrically connected to the node N1, and the anode terminal of the diode D1 is electrically connected to the node N3. A lead L electrically connects the node N3 to a control gate on the switch M.

When the probes P1 and P2 are immersed in sea water, the resistance between the probes P1 and P2 drops and current flows into the capacitor C. Initially, the diode D1 prevents current flow to the node N3, and the switch M remains open, thus preventing current from flowing through the squib 26. When the voltage across the capacitor C (i.e., the voltage between the nodes N1 and N2) reaches the breakdown voltage of the diode D1, current flows through the diode D1 to the node N3, and through lead L to the switch M. The switch M closes, and current flows through the squib 26, causing the squib 26 to fire. The piston 28 is pushed against the member 30 which initiates the release of the buckle.

In other embodiments, an analog or digital circuit may monitor the voltage Vc across the capacitance C, and compare Vc to a threshold voltage Vt. If Vc reaches or exceeds Vt, a signal may be sent to the switch M to close the circuit through the squib 26. Such other embodiments are intended to come within the scope of the present invention.

Figure 5:
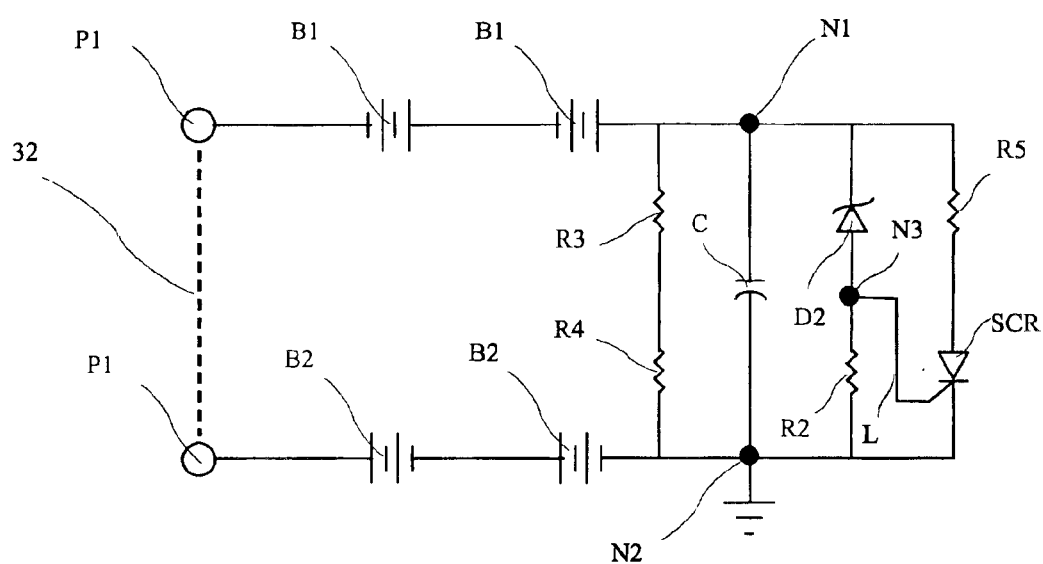
FIG. 5 is a preferred embodiment of a circuit included in a release triggering mechanism.

A preferred embodiment of a circuit of the release mechanism is shown in FIG. 5. Two batteries B2 are serially electrically connected between the node N2 and the probe P2. Two additional batteries B1 are serially electrically connected between the node N1 and the probe P1. The batteries B1 and B2 are preferably long life cells, and more preferably lithium batteries, and most preferably CR1616 batteries. Two resisters R3 and R4 are serially electrically connected between the nodes N1 and N2. The resister R3 is preferably a thermistor, and more preferably a 150-ohm thermistor having a negative temperature coefficient, to allow the circuit to adjust to different operating temperatures. The resister R4 is preferably a 350 ohm resister. A capacitance C is also electrically connected between the nodes N1 and N2, which capacitance C is preferably an approximately 2.7 m Farad capacitance, and more preferably six approximately 0.45 m Farad capacitors, and most preferably part number TPSE477K01R0050 made by Commonwealth Sprague located in North Adams, Mass.

A second diode D2, third node N3, and a second resister R2 are serially electrically connected between the nodes N1 and N2, wherein the node N3 is electrically connected between the diode D2 and node N2, and the resister R2 is connected between the node N3 and the node N2. The cathode terminal of the diode D2 is electrically connected to the node N1, and the anode terminal of the diode D2 is electrically connected to the node N3. The diode D2 is preferably a zener diode, and more preferably (specs for zener diode?) And most preferably part number MA8091-H manufactured by (name, city, state).

The squib 26 (FIGS. 3 and 4) is represented by an equivalent resistance R5 which is serially electrically connected with a Semiconductor Controlled Rectifier (SCR) between the nodes N1 and N2. The SCR is preferably a part number MCR8DSM manufactured by Motorola. A lead L electrically connects the node N3 to a control gate on the SCR. A circuit thus configured provides substantially all the advantages of the circuits described in FIGS. 3 and 4.

Figure 6:
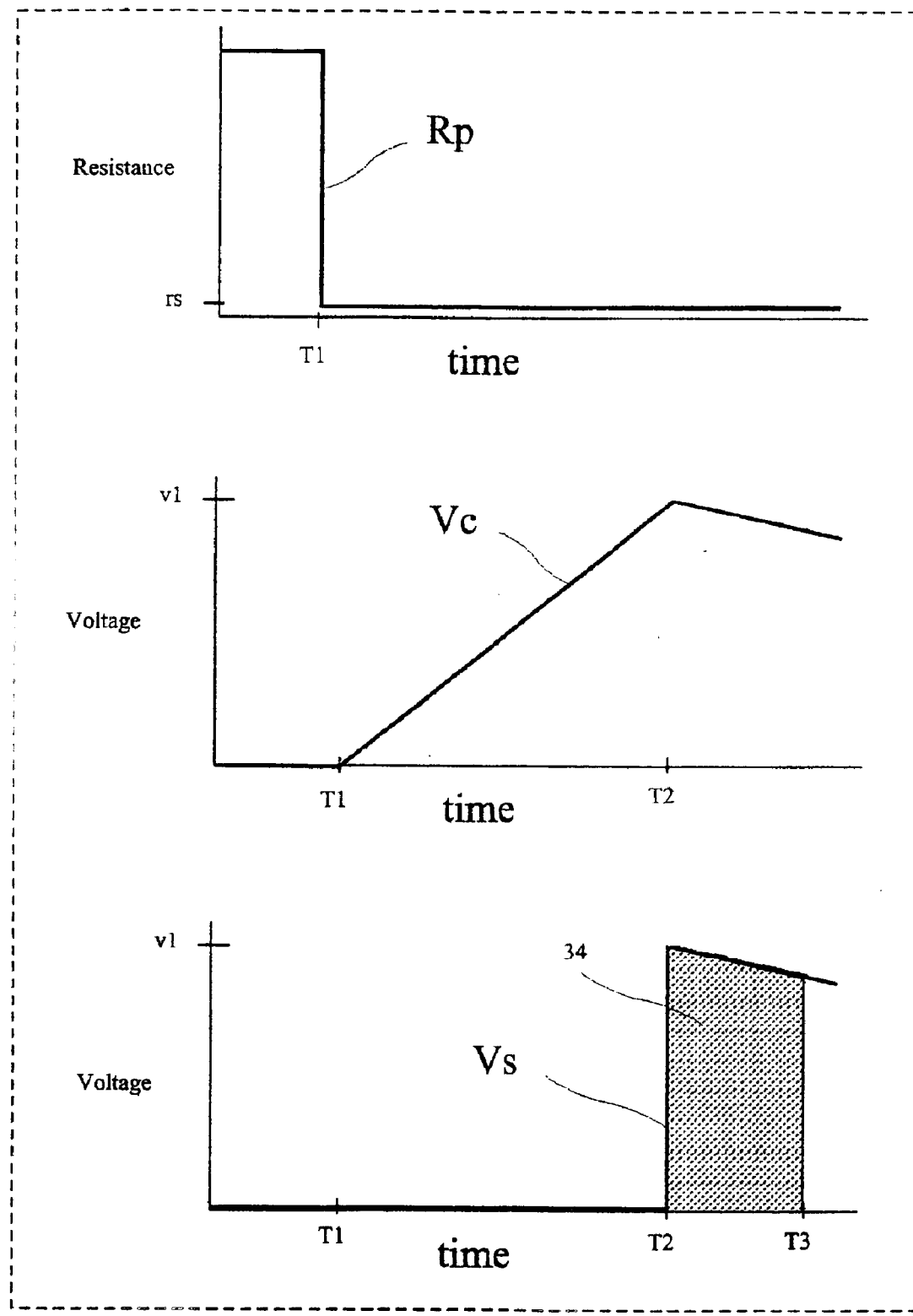
FIG. 6 includes parallel plots of resistance and voltage values during operation of a release triggering mechanism.

The operation of the circuit of FIG. 5 may be more easily ascertained from reviewing FIG. 6. The top plot shows the resistance Rp across the probes P1 and P2. Prior to immersion in sea water, the resistance Rp is very high, and effectively zero current flows between the probes P1 and P2. At time T1, the probes are immersed in sea water, the resistance Rp drops to approximately 100 ohms for 10,000 micromhos conductivity, and current flows between the probes P1 and P2, creating a positive voltage at node N1. The middle plot shows the voltage Vc across the capacitor C, which is also the voltage between the nodes N1 and N2. The voltage Vc is initially approximately zero volts. At time T1, the capacitor begins to charge, and the voltage Vc begins to rise. Initially, the diode D2 prevents current from flowing to the node N3. At time T2, the voltage Vc reaches the breakdown voltage of the diode D2 and current flows to the node N3, to the control gate of the SCR, and the SCR closes the circuit through the squib 26 (or equivalent resistance R5). Starting at T2, voltage Vs flows through the squib 26, and the resulting energy 34 builds in the squib 26. At time T3 the energy raises the temperature sufficiently to fire the squib 26.

Figure 7:
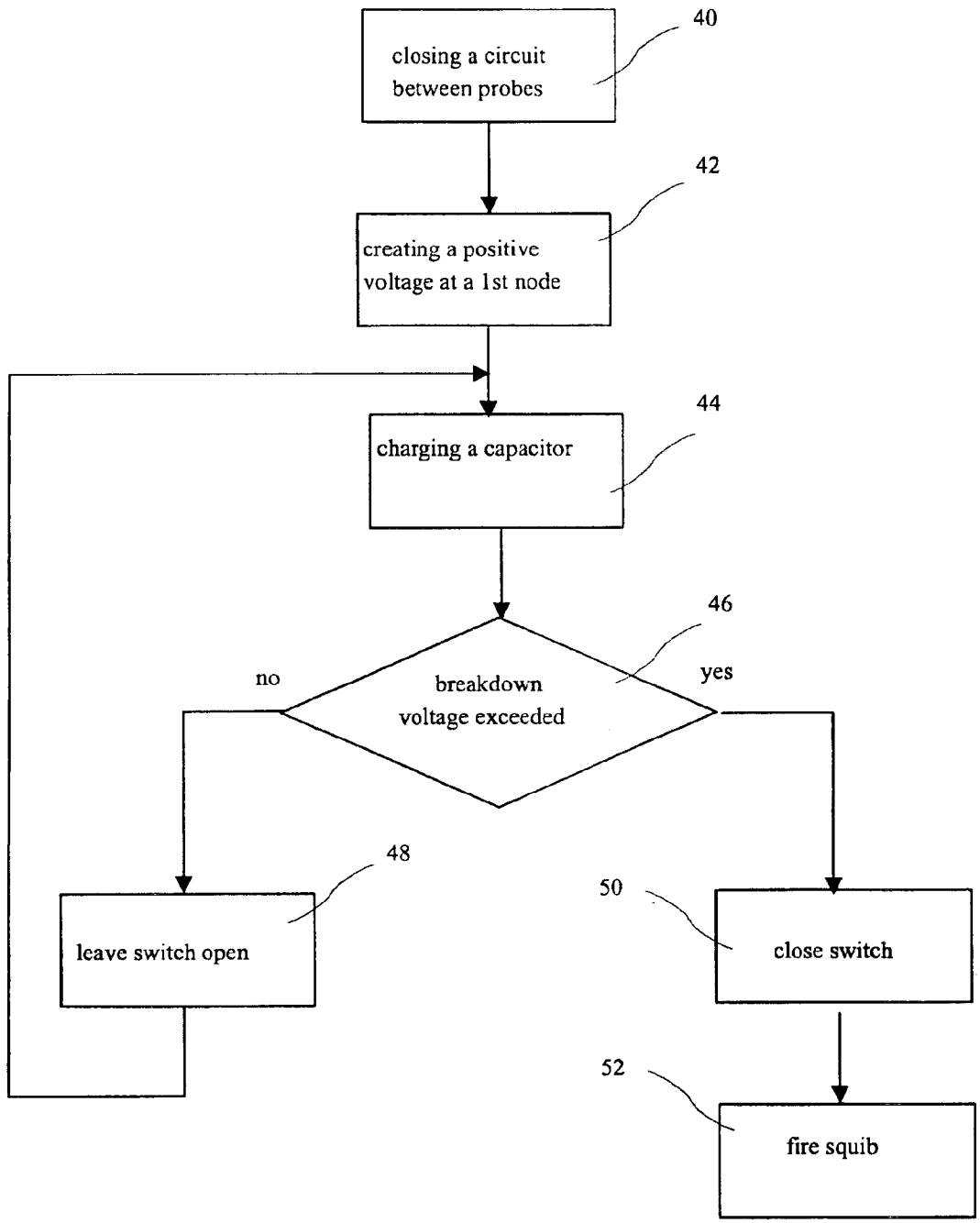
FIG. 7 is a flow chart of a method of operation of a release triggering mechanism.

A method according to the present invention is shown in FIG. 7. The circuit between the probes P1 and P2 is closed at step 40. The resulting current flow creates a positive voltage at node N1 at step 42. The voltage at node N1 causes the capacitor C to charge at step 44. When the voltage Vc across the capacitor C reaches the breakdown voltage of the diode D2 at step 46, current flows to the node N3, and to the switch, causing the switch to close at step 50. Current then flows through the squib 26, and the squib 26 fires at step 52.

The circuits described above, may alternatively be expressed based on the relationship of the circuit elements. Beginning with water actuation, the conductivity (resistance) of the water that the unit is intended to function in is the starting point for the design. Very fresh water, such as from a household tap, has 100 to 1000 micro-mhos conductivity. Sea water, on the other hand, has values of 10,000 to 40,000 micro-mhos conductivity. These conductivity values equate to water resistance of 10,000 to 1000 ohms for fresh water and 100 to 25 ohms for sea water. This resistance appears between the water probes when the unit is immersed in water. Referring to FIG. 3 above, these conductivity values apply to path 32. There is thus formed a series circuit B1/R1/path 32 with voltage divided between R1 and 32. Thus, the value for R1 may be selected based on the voltage is required to fire the selected squib 26.

For example, the squib 26 may require 5 volts to fire. If the voltage drop across the switch (M), when it is turned on, is 0.5 volts, a safety margin is desirable to guarantee that the squib 26 will fire when required. A fifty percent safety margin is preferred for the squib 26 firing voltage. Adding these voltages (5.5 volts+2.75 volt safety margin) results in 8.25 volts. The capacitor C is the source of the firing voltage, and as a result, the switch M preferably triggers when there is 8.25 volts across the capacitor C. A zener diode may be selected that triggers the switch M at approximately 8.25 volts. When the voltage on the capacitor C exceeds 8.25 volts, the switch M turns on and provides 8.25 volts across the squib 26. The value of the resister R1 may be calculated such that the voltage across resister R1 in the R1/path 32/B1 series circuit is greater than the required 8.25 volts. The voltage across the resister R1 is the voltage that the capacitor C will charge toward.

For example, if the voltage B1 is 20 volts, the water is 10,000 micro-mhos, and the resistance of path 32 is 100 ohms, a preferred resistance R1 is approximately 300 ohms. The result is 15 volts across resister R1. When immersed in water, the capacitor C will begin to charge toward 15 volts. When the capacitor C reaches 8.25 volts, the switch M turns on (opens) and the capacitor C discharges through the squib 26 causing the squib 26 to fire.

Alternatively, if the resistance R1 is 100 ohms and B1 remains 20 volts, the capacitor C charges toward 10 volts. As a result of the lower charging voltage, the capacitor C will take longer to charge to 8.25 volts. Further, if the water conductivity changes, the resistance of path 32 changes. If the water resistance changes to 3,333 micro-mhos (300 ohms), and the resistance R remains 100 ohms, the result is 5 volts across the resister R1, and the capacitor C will charge toward 5 volts maximum. In this instance, even if the capacitor C is fully charged (i.e., to 5 volts) there is not enough voltage to fire the squib 26. Thus, the circuit may be designed to fire the squib when immersed water having the desired conductivity, or to obtain a desired delay time to firing the squib 26, and a circuit having the basic architecture described above, and including circuit components selected according to these constraints is intended to come within the scope of the present invention.

While throughout the above description, the use of batteries as a power source had been described, other power sources may be substituted, and a mechanism using another power source is intended to come within the scope of the present invention.

While the invention herein disclosed has been described by means of specific embodiments and applications thereof numerous modifications and variations could be made thereto by those skilled in the art without departing from the scope of the invention set forth in the claims.

We claim:

1. A water activated release mechanism comprising:
   a first probe exposed to the environment;
   a second probe exposed to the environment;
   at least one first battery electronically connected between the first probe and a first node;
   at least one second battery electronically connected between the second probe and a second node; and
   a squib electrically connected between the first node and the second node.

2. The mechanism of claim 1 further including:
   a capacitance C electrically connected between the first node and the second node;
   a resistance R1 electrically connected between the first node and the second node;
   a voltage Vc across the capacitance C;
   a switch between the squib and one of the first node and the second node; and
   means for closing the switch if the voltage Vc is at least a threshold voltage Vt.

3. The mechanism of claim 2 wherein the capacitance C comprises at least an approximately 2.7 m Farad capacitance.

4. The mechanism of claim 3 wherein the at least an approximately 2.7 m Farad capacitance comprises six approximately 0.45 m Farad capacitors, and wherein the resistance R1 comprises an approximately 150 ohm thermistor having a negative temperature coefficient, in series with an approximately 350 ohm resister.

5. The mechanism of claim 2 wherein the at least one first battery and the at least one second battery are electrically connected to produce a positive voltage at the first node, and wherein the switch closing means comprises:
   a diode connected between the first node and the second node;
   a cathode terminal of the diode electrically connected to the first node;
   an anode terminal of the diode electrically connected to the second node;
   a third node electrically connected between the anode terminal and the second node;
   a second resister electrically connected between the third node and the second node; and
   a lead electrically connected between the third node and a control gate on the switch, wherein the switch is normally open, and is adapted to close when the diode conducts.

6. The mechanism of claim 5 wherein the second resister is at least approximately a 10,000 ohm resister.

7. The mechanism of claim 5 wherein the diode is a zener diode.

8. The mechanism of claim 2 wherein the switch comprises a Silicon Controlled Rectifier (SCR).

9. The mechanism of claim 2 wherein the at least one first battery comprises two 6 volt batteries and the at least one second battery comprises two 6 volt batteries.

10. The mechanism of claim 2 wherein the squib comprises a minimum force of approximately 100 lbs and a stroke of approximately 0.25 inches.

11. The mechanism of claim 2 wherein the squib is adapted to provide force and distance sufficient to release the buckle.

12. The mechanism of claim 2 wherein the squib is in thermal cooperation with a heat sink.

13. A water activated release mechanism comprising:
   a first probe exposed to the environment;
   a second probe exposed to the environment;
   at least one battery electronically connected between one of the set consisting of the first probe and a first node, and the second probe and a second node, wherein the at least one battery is electrically connected to produce a positive voltage at the first node;
   a squib and a switch serially electrically connected between the first node and the second node;
   a capacitance C electrically connected between the first node and the second node;
   a diode having a cathode terminal and an anode terminal, wherein the cathode terminal is electrically connected to the first node and the anode terminal is electrically connected to the second node;
   a third node electrically connected between the anode terminal and the second node;
   a second resister electrically connected between the third node and the second node; and
   a lead electrically connecting the third node to a control gate of the switch.

14. The mechanism of claim 13 wherein the at least one battery comprises at least one first battery electronically connected between the first probe and a first node and at least one second battery electronically connected between the second probe and a second node.

15. The mechanism of claim 14 wherein the switch comprises a Silicon Controlled Rectifier (SCR).

16. The mechanism of claim 14 wherein the capacitance C comprises six approximately 0.45 m Farad capacitors.

17. A method for activating a release mechanism, comprising:
   closing a circuit between a first probe and a second probe;
   creating a positive voltage at a first node from at least one of a first battery electrically connected between the first probe and the first node, and a second battery electrically connected between a second node and the second probe;
   charging a capacitor electrically connected between the first node and the second node;
   exceeding a breakdown voltage of a diode having a cathode terminal electrically connected to the first node, and an anode terminal electrically connected to a control gate of a normally open switch, wherein the switch and a squib are serially electrically connected between the first node and the second node;
   closing the switch;
   providing between approximately 550,000 and approximately 5,000,000 ergs of energy to the squib; and
   firing the squib.

18. The method of claim 17, wherein charging a capacitor comprises charging six approximately 0.45 m Farad capacitors.

19. The method of claim 18, wherein closing the switch comprises providing a voltage to a Silicon Controlled Rectifier (SCR) serially electrically connected with the squib between the first node and second node.

* * * * *